United States Patent Office 3,004,034
Patented Oct. 10, 1961

---

3,004,034
2-(2-CYCLOHEXENOXY)BENZOTHIAZOLE
John J. D'Amico, Charleston, W. Va., assignor to Monsanto Chemical Company, St. Louis, Mo., a corporation of Delaware
No Drawing. Filed Dec. 30, 1959, Ser. No. 862,792
1 Claim. (Cl. 260—304)

This invention relates to 2-(2-cyclohexenoxy)benzothiazole which may be prepared as follows:

To a stirred solution comprising 37.8 grams (0.25 mole) of hydroxybenzothiazole, 40 grams (0.25 mole) of 25% sodium hydroxide and 300 ml. of water was added in one portion 42.6 grams (0.25 mole) of 3-bromocyclohexene. After heating at 90–100° C. for 8 hours, the product was cooled to 25° C. and extracted with 400 ml. of ethyl ether. The ether solution was washed with water until neutral to litmus, dried over sodium sulfate and the ether removed in vacuo (1–2 mm.) at a maximum temperature of 80–90° C. The product was obtained as an amber semi-solid in 79.5% yield.

The product destroys pathogenic organisms in soil. Activity was demonstrated against "damping off" fungi present in soil. Those present were principally Pythium, Rhizoctonia and Fusarium species. A stock solution of the test material was pipetted into a glass jar containing one pound of infested soil. The jar was sealed and the contents thoroughly mixed by vigorous shaking. The treated soil was incubated at room temperature for 24 hours, transferred to clay pots and 15 seeds of each of two crop plants sown in each pot. The seeds planted were Delta Pine No. 15 cotton and Straight Eight cucumber. The seeded pots were then incubated at 70° F. at 98% humidity to insure activity of the organisms in the soil. 24 hours later, the pots were removed to a greenhouse and disease assessments made within 10–14 days. The percent emergence and disease incidence were noted and ratings recorded. The ratings were based on inoculated, untreated and uninoculated, sterile soil treatments. Disease incidence (healthy plants out of 30) of 19–24 was observed with a concentration of 100 parts per million of 2-(2-cyclohexenoxy)benzothiazole. At a concentration of 30 parts per million disease incidence was 13–18. In contrast thereto the disease incidence of untreated, inoculated control pots was 0–7.

A concentration of 50 parts per million parts of soil corresponds to a dosage of 100 pounds per six-inch acre. In general, a compound should be active at 60 pounds per acre (30 p.p.m.) to be economically feasible and it will be noted that the compound of this invention is active at this concentration. Additionally, the compound may be used to synthesize more complex molecules.

It is intended to cover all changes and modifications of the examples of the invention herein chosen for purposes of disclosure which do not constitute departures from the spirit and scope of the invention.

What is claimed is:
2-(2-cyclohexenoxy)benzothiazole.

References Cited in the file of this patent
Moore: Chem. Abstracts, vol. 47, col. 10523, (1953).